United States Patent [19]
Conforti et al.

[11] Patent Number: 5,048,958
[45] Date of Patent: Sep. 17, 1991

[54] SELF-FOCUSING OPTICAL SYSTEM FOR SPECTROPHOTOMETRIC MEASUREMENTS AND THE LIKE, WITH OPTICAL FIBER SENSORS

[75] Inventors: Giuliano Conforti, Florence; Massimo Brenci, Pistoia; Andrea A. Mencaglia, Siena, all of Italy

[73] Assignee: Consiglio Nazionale Delle Ricerche, Rome, Italy

[21] Appl. No.: 326,962

[22] Filed: Mar. 22, 1989

[30] Foreign Application Priority Data

Mar. 25, 1988 [IT] Italy ............................. 9369 A/88

[51] Int. Cl.⁵ ........................................... G01N 21/01
[52] U.S. Cl. ................................. 356/300; 250/576; 356/436; 356/440; 356/246
[58] Field of Search ............... 356/300, 436, 440, 246, 356/244; 250/573, 574, 575, 576

[56] References Cited

U.S. PATENT DOCUMENTS 4,853,547 8/1989 Bach .................................. 250/458.1

OTHER PUBLICATIONS

Conforti et al, Proceedings of SPIE-The International Society of Optical Engineering, vol. 985 Fiber Optic and Laser Sensors VI, Sep. 1988, pp. 125-129.
Mignani et al, Proceedings of SPIE, vol. 1014 Micro-Optics Sep. 1988, pp. 42-44.

Primary Examiner—F. L. Evans
Attorney, Agent, or Firm—McGlew & Tuttle

[57] ABSTRACT

An optical system comprising a cavity for spectrophotometric measurements and the like with a first cylindrical refraction index gradient lens matched to an optical fiber. A second cylindrical refraction index gradient lens is provided disposed approximately coaxial to the first lens. The first and second lenses are spaced apart to delimit the cavity between opposite faces of the first and second lenses. A sample under test is positioned within the cavity. A reflecting surface is provided on the face of the second lens opposite said cavity.

4 Claims, 1 Drawing Sheet

SELF-FOCUSING OPTICAL SYSTEM FOR SPECTROPHOTOMETRIC MEASUREMENTS AND THE LIKE, WITH OPTICAL FIBER SENSORS

FIELD AND BACKGROUND OF THE INVENTION

The invention relates to an optical system comprising a cavity for spectrophotometric measurements and the like, using optical fibers for the conveyance of light radiations from an emitting source to the cavity containing the sample on which the measurments must be carried out, and from this to devices for the detection of the modulated radiation.

Various types of optical fiber sensors are based on spectrophotometric measurements carried out on liquids or gases. In these sensors, a suitably modulated and filtered light radiation is conveyed, via an optical fiber, into a cavity containing the medium, generally a liquid or a gas, to be tested for measurement. The measurements are based on the detection of absorbance variations in the medium under test, according to the variation of a specific physical or chemical quantity, such as for example, the temperature, the concentration of a specific component of a mixture, or similar.

The absorbance measurement with optical fibers is usually carried out by utilizing two fibers, one facing the other, one being used for illuminating the sample under test, i.e. for conveying the light radiation from the source to the measuring volume or cavity, and the other being used for picking up the light modulated by the substance under test interposed between the two fibers. In some cases the system comprises only one fiber facing a mirror, or a pair of fibers facing a mirror, the substance under test being interposed between said fibers and the mirror. In these cases, the light radiation passes through the substance under test, is reflected by the mirror, passes through the substance under test again, and is then picked by the same optical fiber which has emitted it or by a fiber adjacent to the latter. In any case, owing to the divergence of the radiation beam emitted by the fiber, the fraction of light which is picked up is very small. Moreover, even small disalignments of the two fibers or of the mirror cause significant reductions of efficiency.

The problems are the more serious the longer the cavity is or the greater volume inside which the measurement has to be performed. In some types of sensors and for particular measurements, in fact, it is necessary that the radiation emitted by the optical fiber goes through a cavity which is some decimeters long, at the opposite end of which—with respect to the end where the radiation input optical fiber is disposed—there must be arranged a flat mirror which is perfectly perpendicular to the axis of the optical fiber at the output section thereof, or a second optical fiber must be provided perfectly aligned with the first one. Even very small disalignments—due to assembly errors, work tolerances, thermal expansions, or the like—between one fiber and the other or between a fiber and the mirror, may cause the complete scattering of the beam.

SUMMARY AND OBJECTS OF THE INVENTION

The object of the invention is to provide an optical system forming a cavity of the above mentioned type, which does not exhibit the above stated drawbacks and which, in particular, allows a high efficiency even in the case of errors of alignment of the optical elements making up the system.

In practice, these and other advantages are obtained by an optical system of the above mentioned type, characterized in that it comprises: a first cylindrical refraction index gradient lens (so called graded index lens or GRIN rod), matched to an optical fiber; a second cylindrical refraction index gradient lens (i.e. GRIN rod) disposed approximately coaxial to the first one and spaced therefrom for delimiting, between the two opposite faces of said lenses, the said cavity for the sample under test; and a reflecting surface on the face of the second lens opposite to said cavity.

In particular embodiment of the invention, said lenses are quarter-period, i.e. quarter-wave, lenses.

Advantageously, the reflecting surface may be formed on the plane face of said second lens.

BRIEF DESCRIPTION OF THE DRAWINGS

The invention will be better understood by following the description and the attached drawing, which shows a pratical, non limiting example of the said invention. In the drawing.

DETAILED DESCRIPTION OF THE INVENTION

Figure 1:
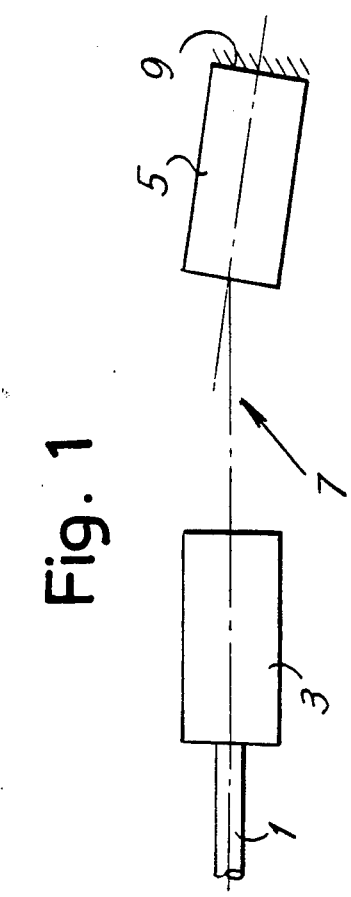
FIG. 1 shows a scheme of the optical system according to the invention.

Referring to the drawings in particular, an optical system according to the invention comprises an optical fiber 1 which is intended both for conveying the radiation to the measurement cavity and detecting the modulated radiation after it has passed through the substance on which the measurement is to be carried out. Said optical fiber 1 is connected to a first cylindrical refraction index gradient lens 3 (so-called graded index rod lens or GRIN rod), disposed coaxial to said optical fiber 1. At a distance L from said first lens 3 a second cylindrical refraction index gradient lens 5 is disposed. The two lenses 3 and 5 are received in corresponding seats of a housing (not shown) designed to define together with said lenses a cavity 7, inside which the substance is tested for the measurements. Said housing may be formed, for example, by a cylindrical hollow support closed at the two ends by lenses 3, 5 and having slots, in the central portion, for the passage of the substance under test. Advantageously, although not necessarily, the two lenses 3, 5 are quarter-period, i.e. quarter-wave lenses·so that each lens has its focus on its respective face.

On the face of lens 5 opposite to cavity 7 a mirror 9 is located able to reflect the beams coming from the optical fiber 1 after they have passed through the first lens 3, the cavity 7 and the second lens 5. The reflected rays pass through the elements 5, 7 and 3 a second time as described in more detail below, to be re-introduced in the fiber 1 and sent to a detection circuit.

Figure 3:
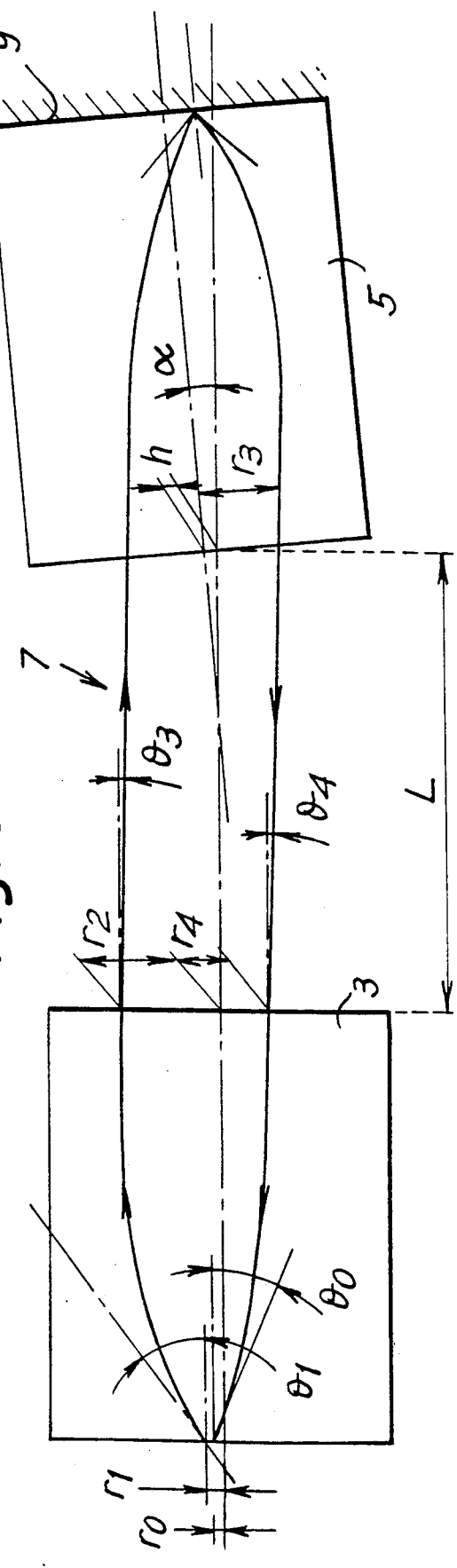
FIG. 3 shows diagrammatically the path of a light ray throughout the optical system of FIG. 1.

In the following description it is supposed that the two lenses 3 and 5 are slightly out of alignment and, in particular, that their axes form a disalignment angle $\alpha$ and are spaced apart by an amount denoted by "h" (FIG. 3). These two parameters represent a possible positioning error in the assembly. As it will be demonstrated later on, this error has no significant influence on the efficiency of the optical system, as long as the angle α is sufficiently small.

For the study of the above described optical system the following variables are defined:

r = distance from the lens axis of a light ray in a generic section of the lens;
θ = inclination of a ray in a generic section of the lens;
$n(r) = n_0(1 - A\ r^2/2)$ index of refraction of the lens, wherein:
   $n_0$ is the index of refraction on the lens axis and A is a quadratic constant of the index gradient.

For a cylindrical, quarter-wave refraction index gradient lens (i.e. a GRIN rod) such as the two lenses 3 and 5 of the illustrated optical system, the coordinates of an output ray are obtainable from the coordinates of the input ray expressed as a column vector by multiplying it by the following matrix:

$$\begin{pmatrix} 0 & -1/\sqrt{A} \\ \sqrt{A} & 0 \end{pmatrix}$$

Figure 2:
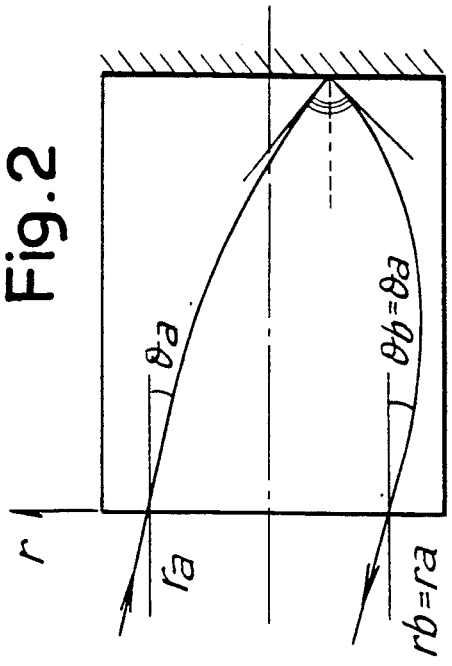
FIG. 2 shows diagrammatically the path of a light ray through the second lens of the optical system of FIG. 1.

With reference to FIG. 2, denoting with "a" and "b" respectively the coordinates r and θ on input to and on output from the lens 5 respectively, it can be demonstrated that the coordinates $r_a$ and $\theta_a$ are linked to the coordinates $r_b$ and $\theta_b$ through the following matrix equation:

$$\begin{pmatrix} r_b \\ tg\theta_b \end{pmatrix} =$$

$$\begin{pmatrix} 0 & -1/\sqrt{A} \\ \sqrt{A} & 0 \end{pmatrix} \begin{pmatrix} 1 & 0 \\ 0 & -1 \end{pmatrix} \begin{pmatrix} 0 & 1/\sqrt{A} \\ -\sqrt{A} & 0 \end{pmatrix} \begin{pmatrix} r_a \\ tg\theta_a \end{pmatrix} = \begin{pmatrix} -r_a \\ -tg\theta_a \end{pmatrix}$$

In conclusion, any meridian ray entering the lens 5 and reflected by the mirror 9 comes out with the same angle of incidence and at a point diametrically opposite to the incidence point.

With reference to FIG. 4 the following parameters are defined:
$r_1$; $\theta_1$ = coordinates of the ray entering lens 3;
$r_2$; $\theta_3$ = coordinates of the ray coming out from lens 3;
$r_3$ = radial coordinates of the ray entering and coming out from lens 5;
$r_4$; $\theta_4 = \theta_3$ = coordinates of the ray entering lens 3 on the side of cavity 7;
$r_0$; $\theta_0$ = coordinates of the ray coming out from the optical system.

On the basis of trigonometric considerations, there is obtained:

$$r_4 = -r_2 + 2L tg\theta_3 + 2h \cdot (1 - tg\alpha tg\theta_3)$$

$r_2$ and $tg\theta_3$ are expressed as functions of the coordinates of the ray entering the system by $$r_2 = tg\theta_1/\sqrt{A}$$

and by $$tg\theta_3 = -\frac{r_1\sqrt{A}\ (n_0/n) \cdot (1 - tg^2\theta_1/2)}{[1 + r_1^2 A \cdot (1 - (n_o/n)^2 \cdot (1 - tg^2\theta_1/2)^2)]^{\frac{1}{2}}}$$

Moreover:

$$tg\theta_0 = -r_4\sqrt{A}$$

By combining the previous expressions together, there is obtained the analytic expression of $tg\theta_0$ as a function of $r_1$, $tg\theta_1$, L, h and tg α:

$$tg\theta_0 =$$

$$tg\theta_1 - 2h\sqrt{A} - \frac{2Ar_1 \cdot (L - h\ tg\alpha)(n_0/n)(1 - tg^2\theta_1/2)}{[1 + Ar_1^2 \cdot (1 - (n_o/n)^2 \cdot (1 - tg^2\theta_1/2)^2)]^{\frac{1}{2}}}$$

The coordinate $r_0$ is given by:

$$r_0 = tg\theta_4/\sqrt{A}$$

The angle $\theta_4$ depends on $\theta_2$ according to Snell's law:

$$\sin\theta_4 = k\sin\theta_2$$

where k is the ratio of the indexes of refraction:

$$k = n(r_2)/n(r_4) = \frac{1 - Ar_2^2/2}{1 - Ar_4^2/2}$$

Being $$r_2 = tg\theta_1/\sqrt{A}\ \text{and}\ r_4 = -tg\theta_0/\sqrt{A}$$

there is obtained:

$$k = \frac{1 - tg^2\theta_1/2}{1 - tg^2\theta_0/2}$$

and $tg\theta_4$ is given by:

$$tg\theta_4 = \frac{k\ r_1\sqrt{A}}{[1 + Ar_1^2 \cdot (1 - k^2)]^{\frac{1}{2}}}$$

Finally, since $$r_0 = tg\theta_4/\sqrt{A}$$

there is obtained:

$$r_0 = \frac{k\ r_1}{[1 + Ar_1^2 \cdot (1 - k^2)]^{\frac{1}{2}}}$$

In the application of refraction index gradient lenses (GRIN rods) according to the invention, the quantity htgα is far less than L and, moreover:

$$\frac{(n_0/n)(1 - tg^2\theta_1/2)}{[1 + Ar_1^2 \cdot (1 - (n_0/n)^2 \cdot (1 - tg^2\theta_1/2)^2)]^{\frac{1}{2}}} \approx \frac{n_0}{n}$$

Which gives rise to the approximate expression:

$$|tg\theta_0 - tg\theta_1| \approx |2h\sqrt{A} + 2Ar_1L \cdot (n_0/n)| \quad (I)$$

and for $A(r_1)^2 << 1$ and $k \approx 1$, it thus follows that $$|r_0/r_1 - 1| \approx |tg\theta_0 + tg\theta_1) \cdot (tg\theta_0 - tg\theta_1)/2| \quad (II)$$

or $$|r_0/r_1 - 1| \approx |(2h\sqrt{A} + 2Ar_1Ln_0/n) \cdot tg\theta_1| \quad (IIa)$$

From equations (I) and (II) it first follows that the angular disalignment between the two lenses 3 and 5, expressed by the angle $\alpha$, has no influence on the parameters of the rays coming out from the optical system, as long as said angle is sufficiently small to give $\cos \alpha \approx 1$, which is a condition that can be always obtained if a fairly accurate assembling of the optical system is observed. From the expressions (I) and (II) it is also possible to determine how much the coordinates of the ray vary after this has gone through the optical system. If said system is applied to a cavity for spectrophotometric measurements, it can be typically assumed that:

$\sqrt{A} = 0.25$ mm$^{-1}$;
$h = 0.05$ mm;
$L = 7$ mm;
$r_1 = 0.07$ mm;
$tg\theta_1 = 0.13$ and with theses numerical values there is obtained:

$|tg\theta_0 - tg\theta_1| \approx 0.1$ $|r_0/r_1 - 1| \approx 1.13\%$

It thus follows that the coordinates r, $\theta$ of the output ray undergo only small variations with respect to the coordinates of the input ray. Thereby, practically all the radiation injected by the optical fiber 1 into the optical system 3, 5, 7, 9 leaves the system (after having gone twice through the substance under test held in the cavity 7) in correspondence of the same position in which it is injected. In this way, more than 90% of the input radiation can be recovered and thus a high efficiency of the optical system can be reached.

In conclusion, the system according to the invention exhibits the following advantages:
1. only one fiber is used;
2. the input radiation passes twice through the cavity;
3. the beam in the cavity is collimated by the lens 3 and not scattered as happens in the current systems for optical spectrophotometric measurements using optical fibers, in which the beam fed into the measuring cavity comes out directly from the optical fiber and it is thus dispersed;
4. an error of disalignment of the two lenses does not give rise to energy losses, that is, the system is self-focusing;
5. the energy losses due to scattering are less than 10%;
6. it is also possible to use very thin fibers thereby obtaining even better efficiencies when the radial coordinate $r_1$ of the input ray is reduced, as it can be seen from equation (IIa).

It is understood that the drawing shows an exemple given only as a practical embodiment of the invention, as this may vary in the forms and dispositions without nevertheless coming out from the scope of the idea on which the same invention is based.

We claim:

1. An optical system comprising a cavity for spectrophotometric measurements and the like, and an optical fiber for the conveyance of the light radiations from an emitting source to the cavity containing a sample to be tested and from the sample to devices for the detection of modulated radiation, wherein a first cylindrical refraction index gradient lens is matched to said optical fiber; a second cylindrical refraction index gradient lens is disposed approximately coaxial to the first lens and spaced from said first lens for delimiting, between two opposite faces of the said lenses, the cavity for the sample under test; and wherein a reflecting surface is arranged adjacent the second lens opposite to said cavity.

2. The optical system according to claim 1, wherein said lenses are quarter-wave lenses.

3. The optical system according to claim 1, wherein said reflecting surface is formed on a flat face of said second lens.

4. An optical system, comprising: a cavity for spectrophotometric measurements and the like; an optical fiber for the conveyance of light radiation from an emitting source to the cavity containing a sample to be tested and for transmitting light from the sample to devices for the detection of modulated radiation; a first cylindrical refraction index gradient lens matched to said optical fiber; a second cylindrical refraction index gradient lens positioned sudstantially coaxial with said first lens and spaced a distance from said first lens to define an area between opposite faces of said first lens and second lens of the cavity for the sample under test; and, a reflecting surface connected to said second lens on a side opposite to said cavity.

* * * * *